(12) United States Patent
Li et al.

(10) Patent No.: US 9,102,997 B2
(45) Date of Patent: Aug. 11, 2015

(54) METHOD OF PURIFICATION FOR RECYCLING OF GALLIUM-69 ISOTOPE

(71) Applicants: Ming-Hsin Li, Taoyuan County (TW); Hsin-Han Hsieh, Taoyuan County (TW)

(72) Inventors: Ming-Hsin Li, Taoyuan County (TW); Hsin-Han Hsieh, Taoyuan County (TW)

(73) Assignee: INSTITUTE OF NUCLEAR ENERGY RESEARCH, Tiaan Village, Longtan, Taoyuan (TW)

( * ) Notice: Subject to any disclaimer, the term of this patent is extended or adjusted under 35 U.S.C. 154(b) by 185 days.

(21) Appl. No.: 13/936,219

(22) Filed: Jul. 8, 2013

(65) Prior Publication Data
US 2015/0010447 A1    Jan. 8, 2015

(51) Int. Cl.
*C22B 58/00* (2006.01)
*C22B 3/20* (2006.01)

(52) U.S. Cl.
CPC ............... *C22B 58/00* (2013.01); *C22B 3/0004* (2013.01)

(58) Field of Classification Search
None
See application file for complete search history.

(56) References Cited

U.S. PATENT DOCUMENTS

2012/0011965 A1\* 1/2012 Li et al. ............................ 75/393

\* cited by examiner

*Primary Examiner* — Melissa Swain

(57) ABSTRACT

A method of purification for recycling of gallium-69 isotopes includes processes of proton irradiation and dissolution for a silver alloy plating target with gallium-69. After the proton irradiation and dissolution, a high concentration elution liquid of gallium-69 and germanium-68 is obtained by washing through an ion-exchange resin to filter out gallium-69 solution, followed by neutralizing precipitation, drying, and sintering treatments to obtain a gallium oxide. The gallium oxide can be dissolved to produce a solid target, and the washing processes can be repeated. The solid target after use can be placed in recycling again. This method is not only implemented to reduce the cost of production and comply with recycling notion nowadays, but also enhance efficiency in the practical application of radioisotopes.

6 Claims, 2 Drawing Sheets

METHOD OF PURIFICATION FOR RECYCLING OF GALLIUM-69 ISOTOPE

BACKGROUND OF THE INVENTION

1. Field of the Invention

The present invention relates to purification and recycling of germanium-69 from radioactive liquid of gallium-68, in particular to a process of development of gallium-69 in a radionuclide generator of germanium-68/gallium-68 for positron emission tomography (PET) including elution, purification and recycling. The method can be used in research and development of radionuclide generator of germanium-68/gallium-68 for PET in the radiopharmaceutical industry.

2. Description of related Art

A conventional elution and purification process for radioactive liquid includes dissolution and filtration for pre-treatment, followed by a washing operation with different concentration and volume of solutions to obtain desired radionuclide. The remaining radioactive waste solution is disposed as usual, not only ignoring the value of recycling but also increasing the pollution of environment with the radioactive waste. If the elution waste liquid containing high level of gallium-69 has not been effectively recovered for reuse in preparation of the solid target, it will result in increasing cost of production and reducing the yield of gallium-68 nuclides. Thus, there is a need for recycling of gallium-69 from the elution waste liquid for cost reduction and improving the yield of gallium-68 nuclides.

In the prior arts, US patent publication No. 2011/0214995 and Taiwan patent application No. 099 104 331, that disclosed methods of purification for obtaining no-carrier gallium-67 with condition of using 15 to 40 million electron volts (MeV) proton for irradiation of plating materials to produce desired nuclide through nuclear reaction. In chemical process, the use of ion exchange resins as an adsorbent and repetitively washing with concentrated hydrochloric acid, and finally the elution waste liquid is evaporated to obtain target nuclides. If the elution liquid of radioactive waste has not been put into recycling, it would be wasteful of resources from recycling point of view.

Gallium-68 has been drawing attention from the industry of radiopharmaceutical, because the germanium-68/gallium-68 generator system can be exploited for radiopharmaceutical related production. In the US patent publication No. US2012/0011965 and Taiwan patent application No. 099 123 148, that disclosed apparatuses and methods for production of gallium-68 isotopes in place of time consuming and costly conventional cyclotron for production of isotopes of gallium-68.

In the application of scintigraphy with PET in today's clinical trials, germanium-68/gallium-68 generator system is one of important source for the production of radiopharmaceutical, since this system has a long half-life from the mother nuclide germanium-68 to produce a short half-life daughter nuclide gallium-68. Before the process of labeling, it is found that using a specific size and concentration of hydrochloric acid in eluting the retention activity off a column may produce chlorine containing solution with no acetate ions.

After a long period of elution trials, the results revealed that use of specific volume and concentration of hydrochloric acid as condition for each column elution, the high yield of gallium-68 nuclides can be achieved. It is also found that if gallium-69 has been collected and recycled after pre-purification of a column for reproduction of solid targets, it can improve the efficiency of utilization of nuclides and also comply with the recycling notion nowadays.

In view of the above drawbacks in the conventional elution and purification process for the radioactive solution, the method of purification for recycling of gallium-69 isotopes of the present invention is made to address the issues.

SUMMARY OF THE INVENTION

To solve the problems mentioned above, the primary object of the present invention is to provide a method of eluate purification for recycling of gallium-69 from germanium-68 eluate by recovering the gallium-69 contained in the germanium-68 eluate for reuse. The gallium-68 eluate can be obtained first by proton irradiation on a silver alloy target plating with gallium-69, followed by dissolving gallium-69/silver alloy plating target with acid solvent to obtain gallium-69 and germanium-68 containing acidic solution, eluting through an ion-exchange resin for pre-purification to wash out gallium-69 eluate, neutralizing with alkaline solvent for precipitation, drying, and sintering, and then obtaining a fully dried gallium oxide. The recovered gallium oxide can be dissolved for production of a new solid target, and an elution process can be repeatedly implemented.

Further object of the present invention is to provide a method of recycling radioactive solution for reuse, effectively reducing the content of gallium-69 in the waste liquid to minimize risk of radioactive liquid waste contamination to environment, and reducing the cost of investment in procuring higher standard environmental facilities. The present invention is not only limited to the production of germanium-68/gallium-68 nuclides generator for PET imaging, but also can be used in the related medicine research and purification process.

The above and other objects, features and advantages of the present invention will become apparent from the following detailed description taken with the accompanying drawings.

DETAILED DESCRIPTION OF THE PREFERRED EMBODIMENT

Figure 1:
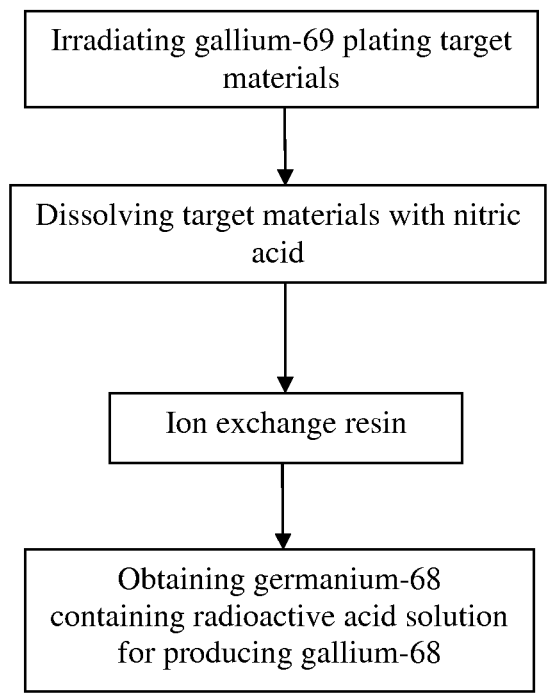
FIG. 1 is a prior art flow diagram of eluate purification process for recycling of radioactive liquid.

In FIG. 1, it shows a prior art flow diagram of eluate purification process for recycling of radioactive liquid. Eluates of germanium-68 after elution still contains high-level gallium-69, if an appropriate eluate purification treatment has not been implemented, the production yield will be reduced and the resources may be wasted as mentioned above, it will not be deliberated here again.

Figure 2:
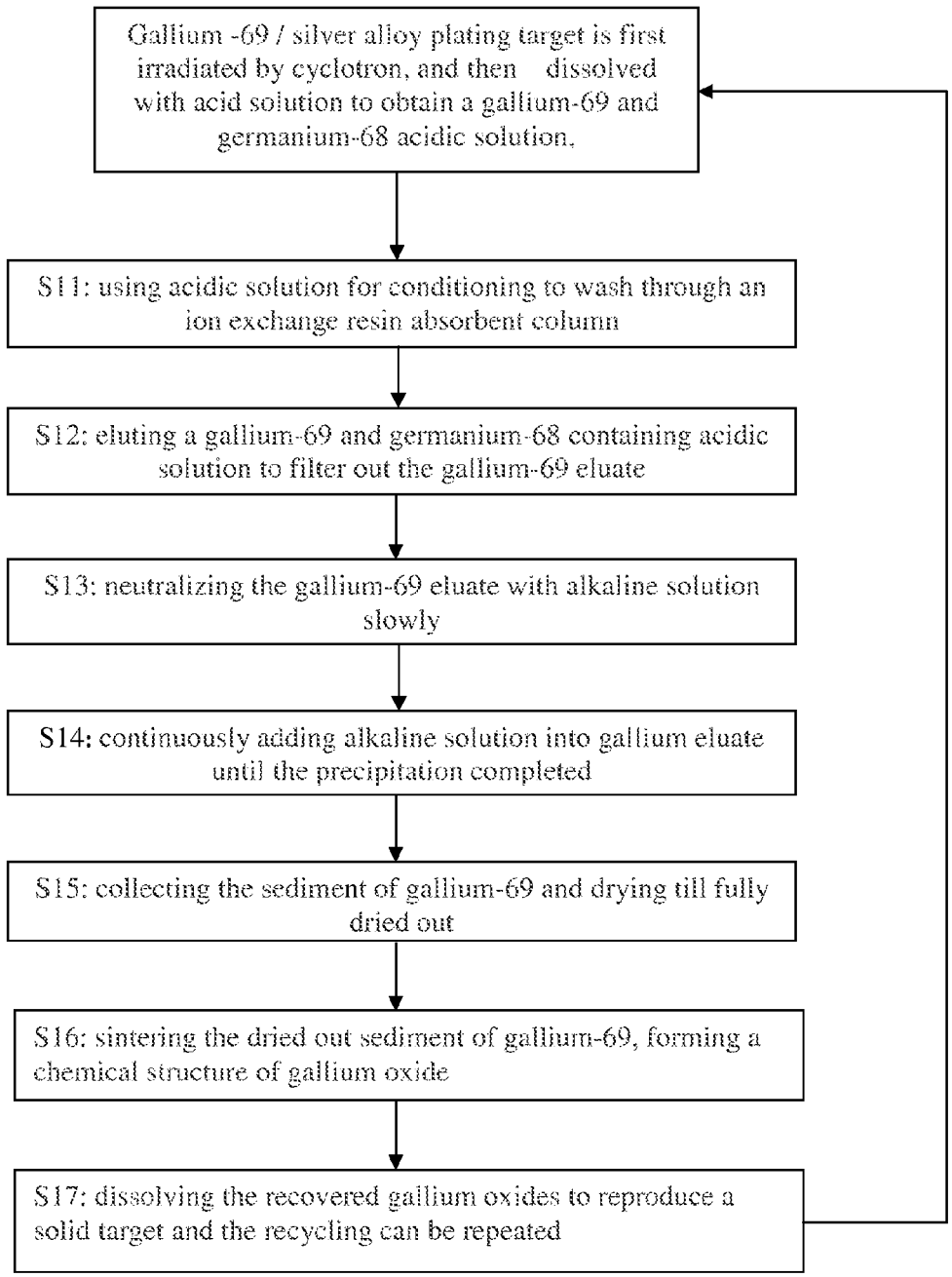
FIG. 2 is an eluate purification process flow diagram of the present invention for recycling of gallium-69 isotopes.

In FIG. 2, it shows an eluate purification process flow diagram of the present invention for recycling of gallium-69 isotopes. The gallium-69/silver alloy plating target is first irradiated by cyclotron, and then the gallium-69/silver alloy plating target is dissolved with acid solution to obtain a gallium-69 and germanium-68 acidic solution, and the gallium-69 is pre-purified comprising steps of:

S11: using acidic solution for conditioning to wash through an ion exchange resin absorbent column, for example, PUROLITE S-910 resin;

S12: eluting a gallium-69 and germanium-68 containing acidic solution to wash through the ion exchange resin absorbent column for pre-purification and filtering out the gallium-69 eluate;

S13: collecting the filtered out gallium-69 eluate, neutralizing the gallium-69 eluate with alkaline solution, monitoring the pH change of the gallium-69 eluate with a pH meter or test strip and adjusting the pH of gallium-69 eluate to neutral slowly;

S14: controlling the addition of alkaline solution into the gallium-69 eluate to make pH be less than 7, the precipitation at the bottom of a container occurs gradually, and continuously adding alkaline solution until the precipitation at the bottom completed.

S15: separating the upper clear liquid and bottom sediment of gallium-69, collecting the sediment of gallium-69 and drying till fully dried out.

S16: sintering the dried out sediment of gallium-69, forming a chemical structure of gallium oxide, completing the procedure of recovering the gallium-69 from gallium-69 eluate; and S17: dissolving the recovered gallium oxides, reproducing a solid target.

An exemplary embodiment of recovering gallium-69 isotopes of the present invent is demonstrated in steps comprising:

S11': using equivalent concentration 9-12N or preferably 10N nitric acid first for conditioning to wash through an ion exchange resin absorbent column, for example, PUROLITE S-910 resin;

S12': irradiating a gallium-69/silver alloy plating target by a cyclotron, followed by dissolving the gallium-69/silver alloy plating target with acid solution to obtain a gallium-69 and germanium-68 acidic solution, eluting the gallium-69 and germanium-68 containing acidic solution to wash through the ion exchange resin absorbent column for pre-purification and filtering out the gallium-69 eluate;

S13': collecting the filtered out gallium-69 eluate, neutralizing the gallium-69 eluate with equivalent concentration 1N or 2N sodium hydroxide, monitoring the pH change of the gallium-69 eluate with a pH meter or test strip and adjusting the pH of gallium-69 eluate to neutral slowly;

S14': controlling the adding of sodium hydroxide into the gallium-69 eluate to make pH be less than 7, and when the pH reaches in the range of 6.5-6.8, the precipitation at the bottom of a container occurs gradually till the precipitation at the bottom completed.

S15': separating the upper clear liquid and bottom sediment of gallium-69, collecting the sediment of gallium-69 and drying at about 100° C. till fully dried out.

S16': sintering the dried out sediment of gallium-69 at about 1100° C., forming a chemical structure of gallium oxide, completing the procedure of recovering the gallium-69 from gallium-69 eluate; and S17': dissolving the recovered gallium oxides, reproducing a solid target.

From the above description, the gallium-69 purification and recovering method of the present invention can effectively filter out the radioactive liquid through elution and purification. It is not only to increase production yield, but also reduce environmental contamination, lowering cost effectively, and complying with the requirement of recycling of useful resources.

The above descriptions is only a preferred embodiment of the invention, any change, modification, variation or equivalent replacement according to this invention should all fall within what is claimed of this invention.

What is claimed is:

1. A method of purification and recycling of gallium-69 isotopes, comprising steps:
    S11: using acidic solution for conditioning to wash through an ion exchange resin absorbent column;
    S12: eluting a gallium-69 and germanium-68 containing acidic solution to wash through the ion exchange resin absorbent column for pre-purification and filtering out a gallium-69 eluate;
    S13: collecting the filtered out gallium-69 eluate, neutralizing the gallium-69 eluate with alkaline solution, monitoring the pH change of the gallium-69 eluate with a pH meter or test strip and adjusting the pH of gallium-69 eluate to neutral;
    S14: controlling the addition of alkaline solution into the gallium-69 eluate to make pH be less than 7, a precipitation at the bottom of a container occurs gradually, and continuously adding alkaline solution until the precipitation at the bottom completed;
    S15: separating the upper clear liquid and bottom sediment of gallium-69, collecting the sediment of gallium-69 and drying till fully dried out;
    S16: sintering the dried out sediment of gallium-69, forming a chemical structure of gallium oxide, completing the procedure of recovering the gallium-69 from gallium-69 eluate; and
    S17: dissolving the recovered gallium oxides, reproducing a solid target.

2. The method of purification and recycling of gallium-69 isotopes as in claim 1, wherein the acidic solution is nitric acid with an equivalent concentration of 9-12N.

3. The method of purification and recycling of gallium-69 isotopes as in claim 1, wherein the alkaline solution is sodium hydroxide with an equivalent concentration 1N or 2N.

4. The method of purification and recycling of gallium-69 isotopes as in claim 1, wherein the pH of Step 14 is in a range of 6.5-6.8 when the precipitation is completed.

5. The method of purification and recycling of gallium-69 isotopes as in claim 1, wherein the drying of Step 15 is with a temperature about 100° C. till fully dried out.

6. The method of purification and recycling of gallium-69 isotopes as in claim 1, wherein the sintering of Step 16 is with a temperature about 1100° C.

* * * * *